United States Patent [19]

Hümer

[11] Patent Number: 4,708,616

[45] Date of Patent: Nov. 24, 1987

[54] EXTRUSION APPARATUS FOR MANUFACTURING FOIL OUT OF PLASTIC

[76] Inventor: Franz X. Huemer, Sonnenuhrgasse 4, 1060 Vienna, Austria

[21] Appl. No.: 858,939

[22] Filed: Apr. 30, 1986

[30] Foreign Application Priority Data

May 9, 1985 [CH] Switzerland ............... 01964/85

[51] Int. Cl.[4] ........................... B29C 47/68
[52] U.S. Cl. ................... 425/133.5; 210/138; 210/232; 264/40.5; 425/150; 425/197; 425/208
[58] Field of Search .......... 425/188, 197, 149, 150, 425/208, 466, 133.5; 415/72, 74; 416/176, 177; 366/80, 87, 90; 264/40.5; 210/138, 232, 234

[56] References Cited

U.S. PATENT DOCUMENTS

| | | | |
|---|---|---|---|
| 3,499,952 | 3/1970 | Kolner et al. | 425/197 X |
| 3,551,943 | 1/1971 | Staton et al. | 425/197 X |
| 3,584,108 | 6/1971 | Nelson et al. | 425/197 X |
| 3,706,827 | 12/1972 | Nott et al. | 425/197 X |
| 3,912,632 | 10/1975 | Winzen | 210/138 X |
| 3,940,335 | 2/1976 | Kalman | 425/197 X |
| 3,971,721 | 7/1976 | Fogarty, Jr. | 425/197 X |
| 4,233,157 | 11/1980 | Miller | 210/138 X |
| 4,257,901 | 3/1981 | Rapp | 366/87 X |
| 4,410,477 | 10/1983 | Claude | 425/197 X |
| 4,451,414 | 5/1984 | Rossiter | 425/149 X |

FOREIGN PATENT DOCUMENTS 1110651 8/1984 U.S.S.R. .................... 425/197

Primary Examiner—Richard L. Chiesa
Attorney, Agent, or Firm—Karl F. Ross; Herbert Dubno

[57] ABSTRACT

In the extrusion apparatus for plastics foil, a smoothing rolling mill (2) is allocated to a device (1) for extruding a soft, warm plastic, in the plasticizing cylinder (3) of which, the plastic is brought to processing temperature and from this conveyed out through a fishtail die (6) by means of a conveyor screw (5), whereby a displaceable filter band (8) is inserted before the fishtail die. In this connection, the filter band (8) has a width of at least approximately the inlet-side width of the fishtail die (6) and is displaceably situated at right angles to the longitudinal extension of the die (6).

Through these measures, an extension apparatus for manufacturing foil out of plastic results, which permits with low filter consumption and optimal and functionally reliable control, the manufacture of a high-quality foil.

1 Claim, 1 Drawing Figure

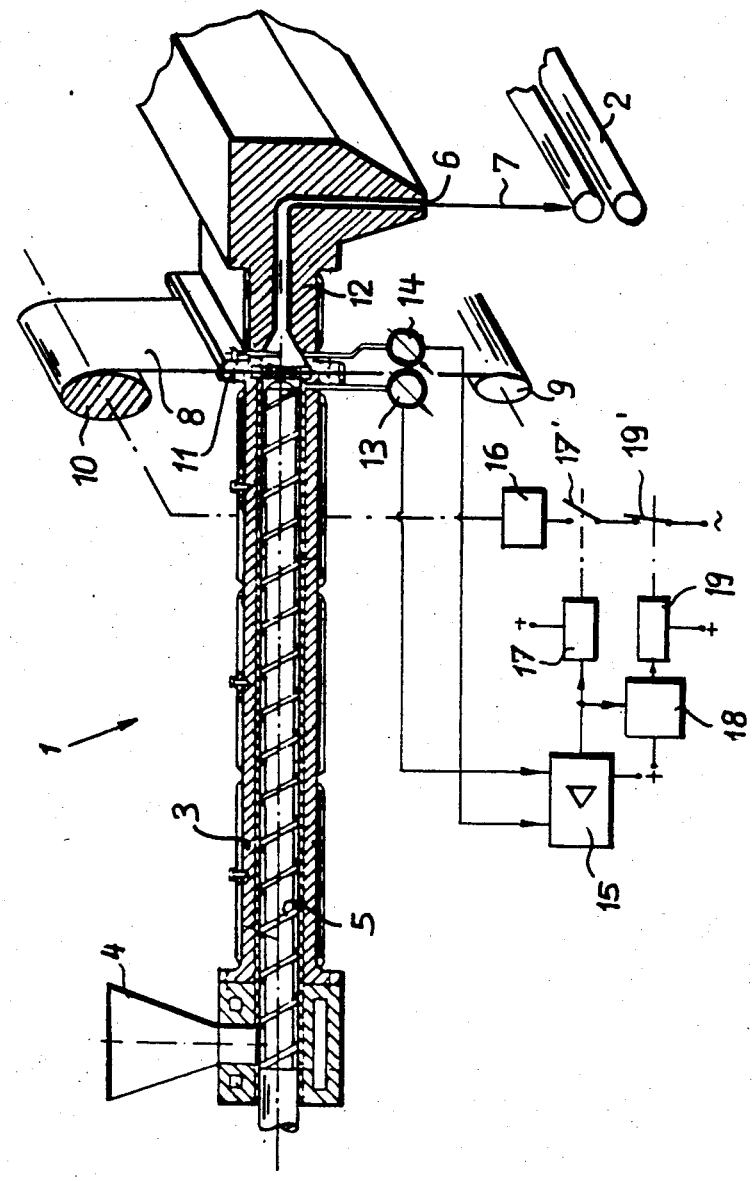

EXTRUSION APPARATUS FOR MANUFACTURING FOIL OUT OF PLASTIC

FIELD OF THE INVENTION

The present invention relates to an extrusion apparatus for manufacturing foil out of plastics, in particular for the subsequent processing thereof into interweavable, narrow, slit-foil tapes, with a device for extruding soft, warm plastic, to which a smoothing rolling mill is allocated and in the plasticizing cylinder of which, the plastic is brought to processing temperature and from this conveyed out through a fishtail die by means of a screw conveyer, whereby a displaceable filter band is inserted before the fishtail die.

BACKGROUND OF THE INVENTION

In arrangements of this kind, it is customary to slide the filter band horizontally according to the art of the extrusion press by means of heat-softened thermoplastic in order to replace, in each case, a section of the filter permeated by impurities with a part that is still clean.

However, in arrangements with fishtail dies for manufacturing foil, by which the die slot has by comparison a very large width and, hence, the active filter band has a disproportionately large length, this art leads to an increased clogging-up of the filter on the exit side of the filter band, clogging occurs because the filter band can be moved only very slowly at right angles the direction of flow of the warm, soft thermoplastic, and, consequently, there is practically never the same rate of passage at all places in front of the die slot. Moreover, there also results an uneven passage of the soft, warm mass of plastic through the filter, i.e. consecutively through the fishtail die, resulting in an uneven foil.

OBJECT OF THE INVENTION

It is thus the object of the present invention to develop an extrusion apparatus of the aforementioned art in such manner that the filter band situated in front of the fishtail die is always penetrated evenly in order to achieve also at every place of the die slot the same rate of flow, resulting in a foil of highest exactitude and quality.

SUMMARY OF THE INVENTION

This is achieved according to the invention by utilizing a filter band which has a width of at least approximately the inlet-side width of the fishtail die and is displaceably situated at right angles to the longitudinal extension of the die.

Although there is necessary here a relatively very wide filter band commensurate to the width of the fishtail die, it requires henceforth only a very small displacement path for the filter band in conformity with the inlet-side gauge of the slot die. The arrangement ensures that at all places of the passage of the thermoplastic, the clogged section of the filter can be replaced practically simultaneously by a part which is still clean. Therewith, the manufacture of a high-quality foil is guaranteed. In addition, the short displacement path of the filter band permits greater displacement intervals, which facilitates the control of the displacement means.

It is customary in such extrusion apparatus to provide at least one pressure sensing element in the conveying route of the warm, soft plastics for generating a control signal for forwarding the filter band. Since the displacement time of the filter band is by comparison very short and the pressure head of the warm, soft plastic mass in front of the filter created by the clogged filter section reduces only very slowly, measures have to be taken to prevent a continuous signal owing to the constant exceeding of the threshold limit of the increase of pressure detected by the pressure sensitive element.

This is achieved according to the invention by a time-dependent short circuit switching, assigned to the switching network, which, upon a control signal of the pressure sensitive element arrangement, switches on the motor drive for transporting the filter band farther.

BRIEF DESCRIPTION OF THE DRAWING

An exemplary embodiment of the subject of the invention is more closely explained in the following by reference to the drawing, which shows in diagrammatic representation the principle of an extrusion apparatus for manufacturing foil out of plastics, in particular for the subsequent treatment thereof into interweavable, narrow, slit-foil tapes.

SPECIFIC DESCRIPTION

According to the drawing, the extrusion apparatus of the invention comprises a device 1 for extruding a warm, soft plastic, to which a smoothing rolling mill 2 is allocated.

The device 1 comprises a heatable plasticizing cylinder 3, in which granulated plastic, inserted through funnel tube 4, is brought to processing temperature and from this conveyed out through a fishtail die 6 by means of a screw conveyer 5. The plastic foil 7 emerging out of the fishtail die 6 then arrives at the rolls of the smoothing rolling mill 2 or a cooling basin or the like, from which place it is taken for further processing.

Superposed on the fishtail die 6 is a displaceable filter band 8, which serves to remove impurities out of the conveyed warm, soft plastics mass, and which is temporarily drawn off from a supply roll 9 and, here, taken up by a motor-driven take-up roller 10. Here, the filter band 8 is guided appropriately in a housing 11 between the plasticizing cylinder 3 and the housing 12 of the fishtail die 6. In this case, the area of passage for the filter band 8 can be, as known, equipped with heating means on the inlet side of the fishtail die 6 in order to temporarily soften parts of the processed plastic, which forms a sealing agent at this place, for the filter band forwarding, which is not shown more closely here.

By comparison with known arrangements of this art, it is here of inventive importance that the filter band 8 has a width of at least approximately the inlet-side width of the fishtail die 6 and is displaceably situated at right angles to the longitudinal extension of the die 6. If, then, the fishtail die 6 extends horizontally, which is the rule, the filter band 8 is drawn through the housing from top to bottom or from bottom to top, as the drawing clearly shows.

As previously mentioned, this arrangement requires only very short displacement distances of the filter band in conformity with the inlet-side gauge of the slot die 6 by comparison with a filter band displacement in the longitudinal extension of the die. This means that with a filter band displacement, a part of the filter band which is still clean is brought in the displacement path of the warm, soft plastic immediately and to every part of the die 6, with which the the hitherto-noncontrolled unevenness of the rate of passage, resulting in uneven foil, is eliminated.

In known manner, pressure sensitive elements 13 and 14 are also placed here in front of and behind the filter band 8 in the conveying route of the warm, soft plastics mass to detect by means of the pressure difference when the respective filter band section is clogged so much with dirt that this has to be replaced.

Being that, as previously mentioned, the displacement time of the filter band is by comparison very short and the pressure head of the warm, soft plastic mass in front of the filter created by the clogged filter section reduces only very slowly, measures have to be taken that prevent a continuous signal owing to the constant exceeding of the threshold limit of increase of pressure detected by the pressure sensitive element.

Accordingly, a time short circuit switching is provided, by which the output signal of the pressure difference circuit 15 succeeding one of the sensitive elements 13 and 14 arrives at a first switching relay 17 as well as via a timing circuit 18 to a delay switching relay 19. The first switching relay 17 switches, upon a signal from the pressure difference circuit 15, the motor 16 on for forwarding the filter band, which may be a stepping motor, via a switch 17'. After an interval, which corresponds to the required displacement distance of the filter band 8, the delay switching relay 19 switches off the motor 16 again via a further switch 19'. This delay switching relay 19 is then excited for a time by a timing circuit 18 and, hence, the switch 19' held open until the pressure rates on the filter band, triggering the impulse, have normalized. For example, the delay switching relay 19 can receive a retaining current of 50 secs. from the time circuit 18, after which the motor 16 can only then be switched on again from the pressure difference circuit 15.

Of course, also other means for producing said short circuit switching are possible.

Thus, from the foregoing, there results an extrusion apparatus for manufacturing foil out of plastic, which permits with low filter consumption and optimal and functionally reliable control, the manufacture of a high-quality foil.

While there are shown and described present preferred embodiments of the invention, it is to be distinctly understood that the invention is not limited thereto, but may be otherwise variously embodied and practiced within the scope of the following claims.

Accordingly, what I claim is:

1. An extrusion apparatus for manufacturing foil out of plastic, in particular for the subsequent processing thereof into interweavable, narrow, slit-foil tapes, said apparatus comprising:
 - a cylinder in which granulated plastic is heated to soften said plastic;
 - a fishtail die downstream from and adjacent to said cylinder, said heated plastic being conveyed through said cylinder by a conveyor means to said die;
 - a filter band displaceably situated at right angles to a longitudinal extension of said fishtail die, said band having a width of at least approximately an inlet-side width of said fishtail die;
 - at least one pressure sensing element for generating a control signal to move said filter band, said one or more elements situated in a conveying direction of said heated soft plastic;
 - a time-dependent short circuit switching unit assigned to a switching network, said unit upon receiving a control signal from said pressure sensing element causing a motor drive to be activated, said drive displaceably moving said filter band.

* * * * *